Harry S. Dolbey
Ed S. Smith, Jr.
INVENTORS

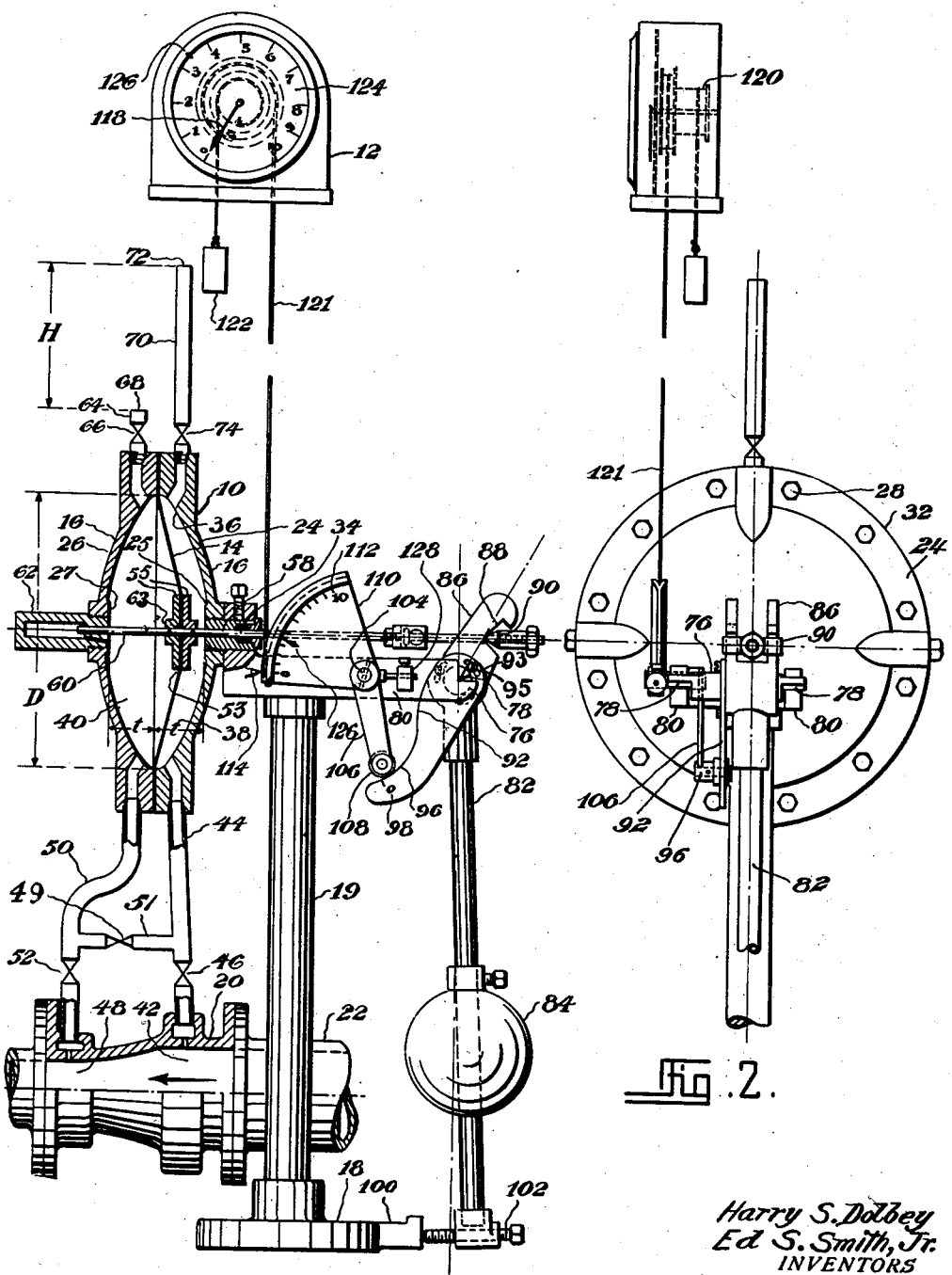

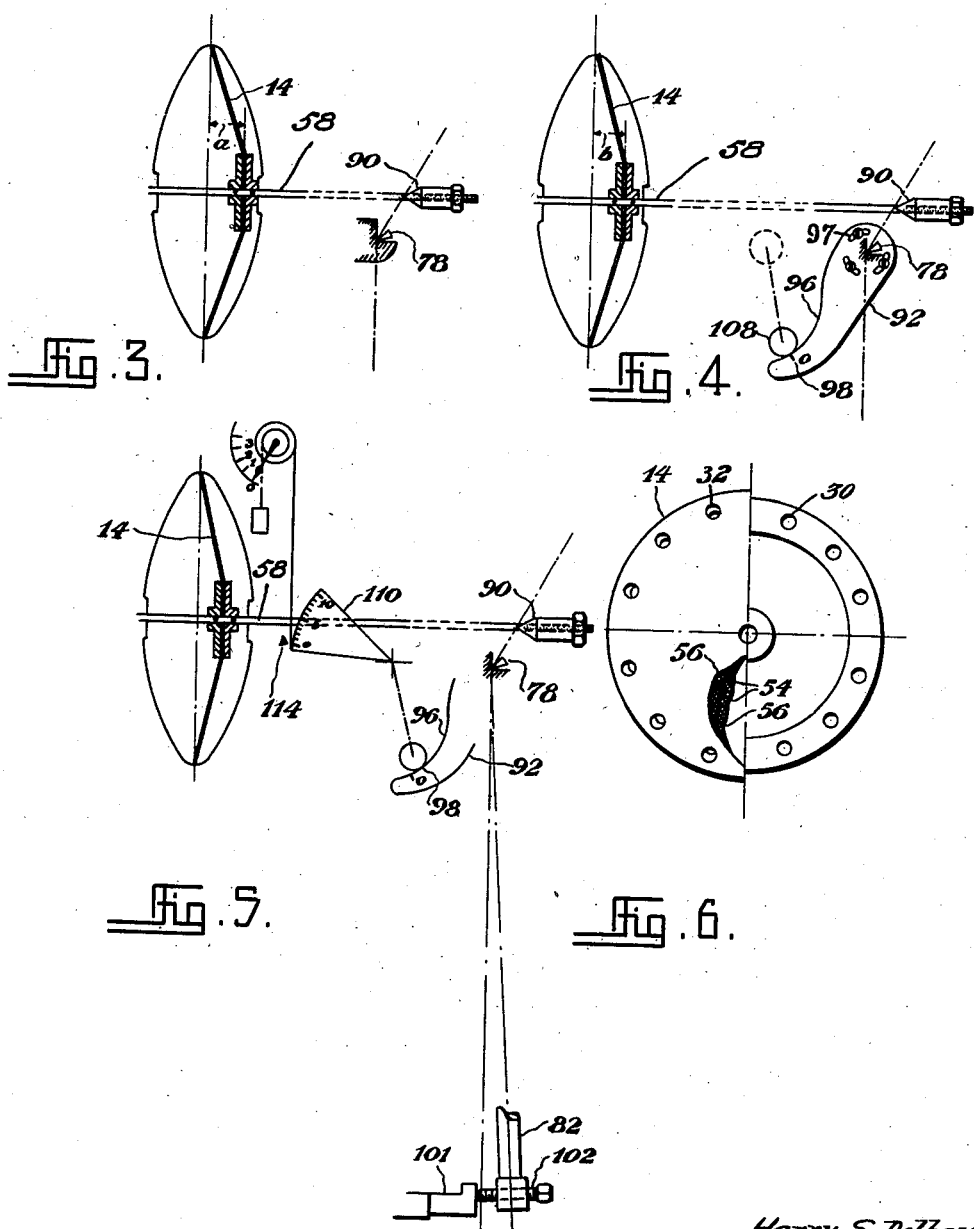

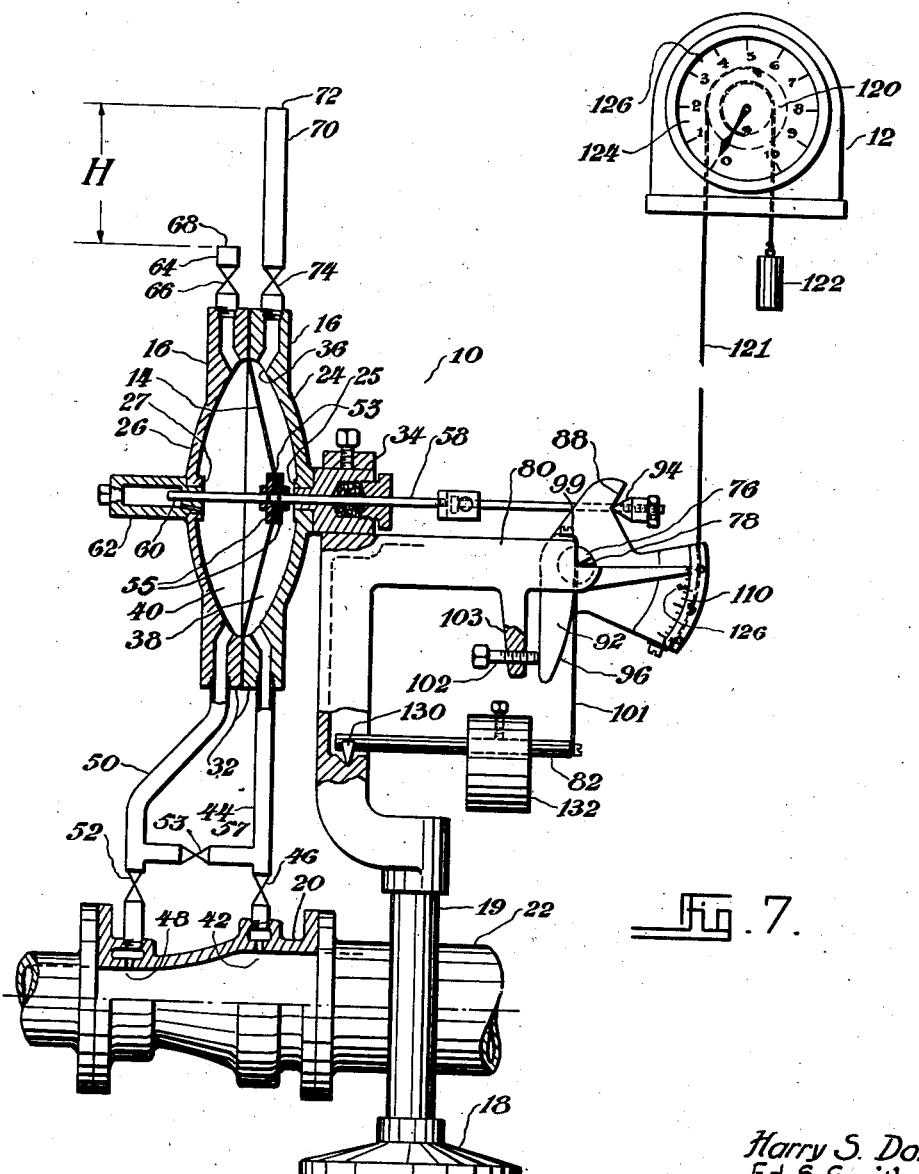

BY Thomas A. Jenkins Jr.
ATTORNEY

Patented Jan. 3, 1933

1,893,200

UNITED STATES PATENT OFFICE

HARRY S. DOLBEY AND ED S. SMITH, JR., OF PROVIDENCE, RHODE ISLAND, ASSIGNORS TO BUILDERS IRON FOUNDRY, OF PROVIDENCE, RHODE ISLAND, A CORPORATION OF RHODE ISLAND

PRESSURE RESPONSIVE DEVICE AND DIAPHRAGM FOR USE THEREIN

Application filed November 23, 1929. Serial No. 409,270.

Our invention relates to pressure responsive devices, particularly adapted for use in fluid meters, including rate of flow meters and loss of head gauges, such as normally used in filter plants.

Our present invention is an improvement on the general type of meter shown and described in the patent issued to Mr. H. S. Dolbey, July 13, 1915, No. 1,146,409 for fluid meters, specifically relating to improvements in the zero setting thereof and adjustment of said device so that diaphragms may be interchangeable therein without changing their accuracy.

An object of our invention relates to a device of this description which may be readily installed on the lower floor of filter plants while the rate and/or loss indicator may be located on the operating floor of the plant.

We preferably provide our gauge with a sealed casing and consequently there is no leakage due to negative head when the loss of head is high, thus eliminating the necessity of placing the open wells used in former types of gauges in pits so that the piping connection would be below the hydraulic grade line. Inasmuch as the gauge is not located in a pit it is much more easy of access than former types besides eliminating the necessity of building the pit.

A further object of our invention is to attach the throat pressure, which is lowest when the Venturi meter tube is employed, to the left hand side of the casing which is completely sealed, thus eliminating air leakage into the system when the head is negative. We also preferably set up our diaphragm units on pipe standards, thus making them very accessible and eliminating former methods of leveling the diaphragm unit which must be used with mercury wells and the initial first cost of mercury and risk of leakage thereof due to accidental differential pressure.

A further feature of our invention relates to making the pendulum weight radially adjustable thereby permitting various maximum operating differentials thereby accommodating the use of a single standard design which is not possible with mercury operated gauges.

A further feature of our invention relates to a method of setting up a diaphragm in an apparatus of this description so that the diaphragm may be interchangeable for others. We preferably employ as a fabric of the diaphragm a strong light fine mesh fabric having a number of textile layers necessary to resist without permanent deformation the required pressure in case of accidental overload and also strong enough to prevent its stretching in use with normal differentials. These layers of fabric are set in live treated pure rubber which protects them and makes the diaphragm nonporous. Thus this design of diaphragm has very little internal friction or tendency to take a "set" and has one definite effective area for each position thereof in use, relative to its no-slack extreme positions. If the diaphragm be stretched taut or flat between the clamping flanges of its casing in the plane thereof, no slack is provided and while such a diaphragm may move slightly under pressure still its movement will be effected by its own mechanical characteristics and the tension of the diaphragm itself to an extent which renders such diaphragms unsuitable for accurate use. We have discovered, however, if a diaphragm is set up as follows an interchangeability of diaphragms is achieved. We preferably first clamp the diaphragm in position with the center thereof at a standard distance from the plane of the clamping flanges in a no-slack position as we have found that the diaphragm is at rest between the limiting no-slack positions as there is no tendency of the diaphragm itself to move so long as there is no differential pressure. We have discovered that diaphragms do not function accurately at the no-slack displacements in either direction and so we preferably initially adjust the diaphragm within its casing so as to have its limiting accurate displacements and its operating range less by definite amounts than its limiting no-slack displacements, and we have found that if diaphragms are set up in this manner that each individual diaphragm will function to accurately register the pressure. Thus, by having the zero position of the diaphragm at a standard definite distance from its no-slack position and having the no-slack position at a standard definite distance from the plane of the clamping flanges thereby making the operating range entirely without the portion of the diaphragm movement liable to inaccuracy, there will always exist a standard relation between the effective diameter of the diaphragm and the actual displacement of the diaphragm at all operating ranges.

A further feature of our invention relates to improvements in the diaphragm casing thereof which consist in providing a stop so as to have a standard no-slack position of the diaphragm and in providing a movable member actuated by said diaphragm which is adjustable to permit the setting of the zero position of the diaphragm at a standard distance from its no-slack position in accordance with the method hitherto explained.

As shown in the Dolbey patent we preferably employ a resisting device to provide a gradually increasing resistance to the movable member actuated by the diaphragm in one direction, and a further feature of our invention consists in making said resisting device readily adjustable to vary the force exerted thereby. In our preferred embodiment, we employ a pendulum and weight and for this purpose make this pendulum weight radially adjustable from its axis.

Further features of our invention relate to the means and method we employ for synchronizing the zero position of the resisting device with the zero position of the diaphragm. In our preferred embodiment we accomplish this result by varying the length of the movable member connecting the diaphragm to the resisting device. We preferably employ in connection with our meter a gauge exhibiting means such as an indicator preferably mounted as stated upon the main floor of the filter plant, which is not as shown in the Dolbey patent referred to. We desire to have the indicator function in a predetermined relation to the differential pressure and, in order that this definite relation may exist, we preferably employ cam means for this purpose. We have also discovered that a resisting device such as the pendulum we employ is inherently inaccurate near its zero position and hence we preferably set the actual working zero position of the resisting device away from its absolute zero to eliminate these inaccuracies and adjust the cam means and exhibiting means to align the exhibiting means with the chosen zero position of the resisting device away from its true zero, where a pendulum is employed as the resisting device, by means of providing an adjustable stop for the setting thereof. We also preferably so construct our device that the diaphragm may be tested or adjusted at a certain differential as well as at zero and provide test pipes having a certain differential height and a test mark on our exhibiting means to correspond to the differential of the test pipes. Then by adjusting the radial position of the pendulum from its axis or by otherwise adjusting the resisting device it is possible to employ a known standard flat diaphragm for a number of differentials.

In our specific type of apparatus we preferably employ an adjustable tension link for connecting the resisting device to the diaphragm, and as this link is normally held in tension it is made quite small in diameter so that any ordinary change of pressure will not have any appreciable effect, and there is employed in connection therewith a relatively small stuffing box; thereby reducing the stuffing box friction to a minimum thus permitting the maximum sensitivity to be obtained, as well as minimizing stuffing box leakage. We preferably employ a diaphragm, to be used in connection with two flange sections, to provide the necessary compartments variable on changes of differential pressure and as stated we preferably provide a diaphragm of a larger internal diameter when flat than the interior of said flange sections to provide for the standard no-slack position and standard zero settings thereof. As the sections are normally clamped together with bolts we thus arrange the flange bolt holes in a circle of a standard diameter and the bolt holes in the diaphragm in a circle of a slightly larger diameter so as to make the no-slack position of the diaphragm at a standard distance from the plane of the flanges.

These and such other objects of our invention as may hereinafter appear will be best understood from a description of the accompanying drawings which illustrate embodiments thereof, In the drawings, Fig. 1 is a side elevation of a differential pressure gauge constructed in accordance with our invention attached to a Venturi meter tube located in a conduit with a portion of the Venturi tube and the diaphragm casing shown in section and with the exhibiting means located on the main floor of the filter plant.

Fig. 2 is an end elevation of a portion thereof.

Fig. 3 is a diagrammatic side elevation partially shown in section illustrating how the no-slack position of the diaphragm is obtained during the initial setting thereof.

Fig. 4 is a diagrammatic side elevation also partially shown in section showing how the zero position of the daphragm and cam means are attained.

Fig. 5 is a diagrammatic side elevation partially shown in section further illustrating how the pendulum and indicating means may be set at an operating zero away from the true zero of the pendulum.

Fig. 6 is a diagrammatic end elevation with one of the casings removed and a half diaphragm diagrammatically superimposed thereon with a portion of the diaphragm broken away to illustrate the structure thereof and the fact that the bolt holes in the diaphragm are normally arranged in a circle of a larger diameter than that of the clamp bolt holes.

Fig. 7 is a diagrammatic side elevation partially shown in section of a slightly different embodiment of our invention employing a different type of a resisting device and cam means for actuating the exhibiting means thereof.

Figures 8, 9:
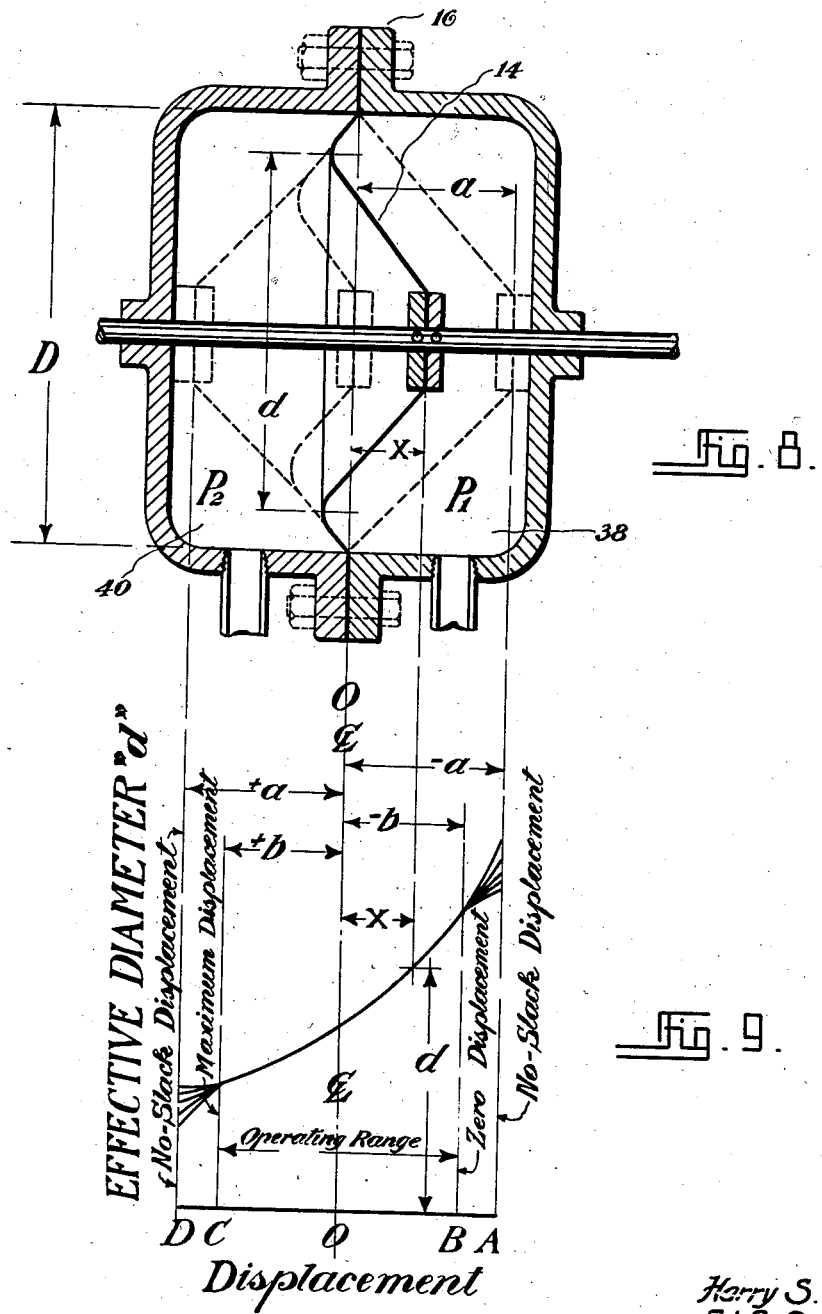
Fig. 8 is a sectional view of a diaphragm illustrating various positions the diaphragm may take in its operating range so set as to not be affected by the characteristics of the individual diaphragms near their no-slack position.
Fig. 9 is a graph illustrating how we set the diaphragms so as to have their operating range outside the range where inaccuracies occur in diaphragms.

In the drawings, wherein like characters of reference indicate like parts throughout, 10 generally indicates a fluid pressure responsive device constructed in accordance with our invention. As stated hitherto, we have provided a unit wherein the parts thereof actuated by the pressure differential may be readily located downstairs in the filter gallery while the exhibiting means 12 thereof may be readily located on the operating floor of the plant.

We preferably employ a diaphragm 14 in a sealed casing 16 as the member controlled by the differential which diaphragm 14 is preferably enclosed in the sealed casing 16. In order to suitably mount our device in the filter gallery, we provide a mounting standard 18 on the floor thereof adjacent the differential producer which in the embodiment shown comprises the Venturi meter tube 20 connected to the conduit 22, and we preferably mount the sealed casing 16 vertically on said standard so that the diaphragm 14 thereof assumes a vertical position. While the sealed casing 16 may be constructed in any suitable manner we preferably provide the use of an upstream flange section 24 and a downstream flange section 26 adapted to be clamped together by the medium of the bolts 28 which extend through the bolt holes 30 in the flanges of said sections and the bolt holes 32 in said diaphragm 14. The upstream section 24 is provided with the stuffing box 34 in the side wall thereof. As shown more particularly in Fig. 6, for a reason to be explained, the bolt holes 32 of the diaphragm 14 are arranged in a larger bolt circle than the bolt holes 30 of the flanges thus providing a diaphragm 14 having a larger diameter when flat than the interior 36 of said sections. It is thus obvious that said diaphragm 14 is mounted between the sections 24 and 26 of said casing to form an upstream compartment 38 and a downstream compartment 40 each variable in size, each connectable to the Venturi meter tube 20 or other pressure differential producing means employed and variable in size in accordance with the pressure produced thereby. In my preferred embodiment the upstream compartment is connected to the upstream end 42 of the Venturi meter tube, by the medium of the pipe 44 having the valve 46 therein and the downstream compartment 40 is connected to the throat 48 of the Venturi meter tube by the pipe 50 having the valve 52 therein. Said pipes 44 and 50 are connected by the by-pass line 51 having the by-pass valve 49 therein to equalize the pressures in compartments 38 and 40 to bring the diaphragm to zero position.

As shown in Fig. 6 we preferably construct our diaphragm 14 of a plurality of textile layers 54 of a strong light fine-mesh fabric capable of withstanding required variations in pressure set in pure treated live rubber 56 which protects them and renders the diaphragm 14 non-porous, thus providing a diaphragm having minimum friction or tendency to take a set and a diaphragm which has a definite effective area for each relative position thereof in use.

A further feature of our invention relates to the fact that the throat 48 of the Venturi meter tube is attached to the compartment 40 of the casing which is completely sealed thereby eliminating air leakage into the system when the head at said Venturi throat is negative. As shown in the drawings, our improved standard preferably consists of a standard pipe 19 which makes it very accessible and eliminates refined methods of levelling necessary in mercury wells. As will be apparent, in order to have a standard no-slack position of the diaphragm to permit interchangeability of diaphragms, we preferably employ on the interior of each casing wall 24 and 26 the stops 25 and 27 respectively for the repeated setting of interchangeable diaphragms therein. In practice, the center portion 53 of the diaphragm is clamped between the plates 55 and the movable member or tension link 58 is secured to said plates in such a manner that the end 60 thereof may freely slide in the sealed pipe 62 in the side wall of the downstream section 26. The center portion 63 of said clamps are preferably raised up to form suitable means to abut the stops 25 and 27 at the desired standard no-slack positions of the diaphragm 14. The movable member 58 is preferably continuously in tension, and since it is continuously in tension, it is possible to make it quite small in diameter so that any ordinary change in pressure will not have any appreciable effect and to reduce its friction in the stuffing box 34 to a minimum. For a purpose to be described we provide a relatively short test pipe 64 having a valve 66 therein, and provided with the open end 68 attached to the downstream compartment 40 of said casing, and we provide the relatively longer test pipe 70 bearing a standard differential or height to the test pipe 64 having the open end 72 and valve 74 therein connected to the upstream compartment 38 of said casing 16. We provide the shaft 76 having a knife-edge 78 at each end thereof adapted to rest on the pedestal 80 of said standard 18. We rigidly attach a pendulum arm 82 to said shaft 76 and we provide the pendulum weight 84 adjustable radially of said arm 82 relative to the axis or shaft 76. We also provide the arm 86 rigidly attached to said shaft 76 which arm may be integral with the pendulum shaft 82 and which arm is provided with the suitable notch 88 therein. The movable member 58 preferably comprises a tension link connected to the plates 55 embracing said diaphragm 14 and extending through the stuffing box 34 of said upstream section. The length of the link 58 is preferably adjustable, for a purpose to be described, and in order to make it readily adjustable we provide said link 58 with the knife edge 90 projecting laterally therefrom threadedly adjustable on said member and registering in said notch 88 on said arm 86. We also provide a cam arm 92 mounted on a collar 93 also mounted on said shaft 76 adjustable relative to the pendulum arm 82 by means of the locking screws 95 fitting through the slots 97 in said collar and into said pendulum arm 82 and provided with the cam surface 96 having the zero mark 98 thereon; said cam 96 is preferably provided in accordance with the teachings of the Dolbey patent to cause the exhibiting means 12 thereof to move in a predetermined relation to the differential pressure and preferably so that the exhibiting means may move in equally spaced amounts. Where our device is employed as a differential rate of flow controller said cam surface may be constructed to move in accordance with the square root of the differential by means of proper calibration. For a purpose to be described, we provide the standard 18 with the extension 100 and we provide on said pendulum arm 82 the extension arm 102 adapted to abut said extension 100 for providing an actual setting of the pendulum 84 offset from its true zero near which point uncertainties are apt to take place.

While the exhibiting means 12 may be actuated through the medium of said cam surface 96 in any suitable manner we preferably provide the shaft 104 mounted on said standard 18 parallel to said first shaft 76 and we rigidly mount the arm 106 thereon and provide it with the cam roller 108 to abut said cam surface 96. As shown in our preferred embodiment we also rigidly attach the quadrant pulley 110 to said shaft 104. If desired, said quadrant pulley may however, itself function as the exhibiting means and for this purpose may be provided with the indicating indicia 112 thereon and in which case the indicator pointer 114 may be mounted on said standard adjacent said indicia 112 to thus indicate in the filter bed gallery. As stated, however, we preferably mount our exhibiting means 12 a substantial distance away from said meter tube 20 and standard 18 preferably on the plant floor. Said exhibiting means 12 is provided with the indicating hand 118 and has the pulley 120 mounted thereon. We then provide means to connect the quadrant pulley 110 with the exhibitor pulley 120, such as the cord 121 which as shown positively engages the exhibitor pulley 120. The control weight 122 is also attached to said cord 121 to keep the cord 121 taut. Said exhibiting means 12 is also provided with the indicating indicia 124 thereon which preferably includes a special test mark 126 for use in connection with the test pipes 64 and 70 heretofore described.

We also preferably make our device balanced throughout, the quadrant 110 being balanced by the control weight 128 also attached to said shaft 104 and readily movable relative therewith.

The embodiment shown in Fig. 7 is substantially identical to the embodiment shown in Fig. 1 with the exception that we provide, instead of the pendulum weight 84 as a resisting device, the pivoted weight arm 82 pivoted as at 130 to the standard 18 and having the weight 132 adjustable radially thereof relative to its pivot point 130. In this embodiment the quadrant 110 is rigidly attached to the shaft 76 and the cam arm 92 also rigidly attached to said shaft 76. The end of the weighted lever 82 is attached to a portion 99 of said cam arm 92 by means of the cord 101 which thus rides over the cam surface 96 in a manner similar to the action of the roller 108 in the prior embodiment. The adjustable stop 102, for regulating the zero setting position of the tension device, namely, the weight 132 in this instance, is mounted on the extension 103 of said standard 18 depending from the upper portion thereof and abuts the rear surface of the cam arm 92. The quadrant 110 is connected to the exhibiting means through the medium of the cord 121 in similar fashion, and the device functions in general similar to the functioning of the other device with the exception that no adjustment is necessary between the cam surface 96 and the quadrant 110 and since the extra movement of the roller 108 on the cam is eliminated the device is more sensitive at low differentials.

As diagrammatically explained in Figs. 8 and 9 we provide a novel method of constructing and setting up a diaphragm which comprises initially adjusting the diaphragm 14 within its casing 16 so as to have its limiting displacements in its operating range as shown in Fig. 9 less by definite amounts than its limiting no-slack displacements, whereby interchangeability of diaphragms is achieved. We have discovered that the reason why diaphragms of this type have not been readily replaceable is, that there are apt to be variations between individual diaphragms near their no-slack positions and our invention includes locating the operating range of a diaphragm so as not to include this irregular area, namely, by placing the zero and maximum displacements thereof, normally encountered in the operating range, standard amounts from the opposite no-slack displacements of the diaphragm thereby eliminating the irregular performance shown as D. C. and A. B. in Fig. 9. Thus as the diaphragms function similarly in the ordinary range COB in Fig. 9 interchangeability of diaphragms is rendered possible. Fig. 9 diagrammatically illustrates the functioning of the diaphragm shown in Fig. 8. By initially adjusting the diaphragm within its casing 16 so as to have a standard no-slack displacement plus "$a$" and minus "$a$", we also provide a standard relation between the effective diameter D of said diaphragm and the actual displacements of the diaphragm at all operating positions and, as explained, said displacements $b$ are sufficiently less than said no-slack displacements "$a$" thereby eliminating the use of the inaccurate range from A to B and C to D, where the normal variations of individual diaphragms affect the effective diameter near the no-slack positions. Figs. 3 and 4 illustrate the means we employ to set the diaphragm 14 in a standard no-slack position. For this purpose, the knife-edge 90 registers in the notch 88 and is adjustable along the tension link 58 by its threaded connection therewith. With the pendulum vertical the diaphragm 14 is first loosely clamped between the casing flanges 24 and 26 and by means of threading the knife-edge 90 on said tension link 58, the center portion 53 of said diaphragm is pulled to its no-slack zero-end position the distance $a$ in Fig. 8 of until the center portion of the plates 55 abuts the respective stop 25 on the casing flange 24, thus moving the diaphragm 14 over to its standard no-slack position shown in Fig. 3 after setting the pendulum in a true zero vertical position in a manner to be explained. We then as shown in Fig. 4, unscrew the knife-edge 90 a known predetermined amount in the embodiment shown one full turn to permit the diaphragm 14 to slide back the distance $a$ minus $b$ so that it is at the distance $b$ from the plane of the clamping flanges thus locating its zero position at a standard definite distance both from the plane of the clamping flanges and from its standard no-slack position and synchronizing its true position with the true zero position of the pendulum which remains at its true zero position during the turning movement. The diaphragm is clamped tightly between its flanges after it has been moved over to its standard no-slack position and the diameter of the ring of bolt holes 32 in the diaphragm is made sufficiently larger than that of the bolt holes 30 in the flanges to permit the diaphragm to be taut when moved over to its standard no-slack position $a$ shown in Fig. 3. By thus locating the zero position and the operating range of the diaphragm within the limits wherein all dimensionally-identical diaphragms have similar variation of effective areas we have made it possible to have interchangeable diaphragms.

By so obtaining the zero position of the diaphragm 14, it is correlated with the pendulum zero so that there will be a perfectly definite zero position of the pendulum corresponding to the zero position of the diaphragm. The resisting device is then allowed to rest at its true zero position, namely, where a pendulum is employed, by having the pendulum hang vertically. As stated previously uncertainties exist with pendulums and other resisting devices near their true zero position. To eliminate these variations the set screw 102 is provided. After the diaphragm 14 has been set at its desired zero position in synchronism with the true zero of the resisting device in the manner just explained, the set screw 102 is set to have the pendulum hang vertically.

As shown in Fig. 4, the cam arm 92 is moved so that the cam roller 108 will be adjacent the cam zero 98 on the cam surface 96 thereof. The adjusting stop 102 is then turned up one turn; a definite standard amount from its zero position to move its operating range a definite amount from the true zero or vertical position of the pendulum or resisting device. The zero indicating device 118 of the exhibiting device 12 and/or the quadrant pulley 110 is then set to its true respective zero as shown in Fig. 5. This method of setting gives a positive and definite zero return to the gauge which feature is very advantageous since if the gauge indicates a slight flow when there is none, it raises an operating question as to whether the valves are properly set. This method of setting the gauge also permits the indicating hand to be set exactly without levelling the apparatus unit in the filter piping gallery and going up to the operating floor to set the indicator and with the minimum effort since the operator can leave the pendulum unit in the filter piping gallery and go up to the operating floor to set the indicator. As stated, we have provided means whereby the gauge may be tested at a certain differential H as well as at zero. To this end we have provided the test pipe 70 attached to the upstream compartment 38 of a greater length than the test pipe 64 attached to the downstream compartment 40, said pipes producing the differential H. We also provide the test mark 126 on the exhibitor dial 124 corresponding to said differential. This arrangement permits even a non-standard diaphragm to be used. When employing the test pipes they are filled to the desired level by opening the valves 52 and 46 in the connecting pipes 50 and 44 so as to permit the open ends 72 and 68 of said pipes 64 and 70 to overflow. By shifting the radial position of the pendulum weight from its axis, said pendulum 84 may then be adjusted so that the indicating means of the exhibiting means 12 will lie just opposite its test mark 126. The device shown in Fig. 7 operates in similar fashion, the cam 96, however, functioning against the taut cord 101 instead of against the roller 108 and the resisting device 82 being moved at the desired distance from its true zero setting by one turn of the bolt 102 registering against the cam arm 92.

It is understood that our invention is not limited to the specific embodiments shown and that various deviations may be made therefrom without departing from the spirit and scope of the appended claims.

What we claim is:

1. A pressure responsive device, comprising a Venturi meter tube in a conduit, a mounting standard adjacent said Venturi meter tube and having an extension, a sealed casing vertically mounted on said standard and comprising upstream and downstream flanged sections, the upstream section having a stuffing box in the side walls thereof, a diaphragm having a larger diameter when flat than the diameter of the interior of said sections and mounted between said flanged sections to form upstream and downstream compartments variable in size according to the differential produced by said Venturi meter tube, said sections each having standard stops projecting inwardly from each side wall thereof to provide standard no-slack positions for said diaphragm, a pipe connecting the upstream compartment with the upstream end of said Venturi meter tube, a pipe connecting the downstream compartment with the throat of said Venturi meter tube, a relatively short test pipe having an open top end and connected to said downstream compartment, a relatively longer test pipe having an open top end and connected to said upstream compartment, a shaft having a knife-edge mounted on a portion of said standard, a pendulum arm mounted on said shaft, a pendulum weight adjustable longitudinally of said arm, an arm also mounted on said shaft having a notch therein, a tension link connected to said diaphragm extending through the stuffing box of said upstream section and having a knife-edge adjustable length-wise thereof registering in said notch, an adjustable stop mounted on said pendulum arm and adapted to abut said extension of said standard for zero setting of said pendulum, a cam arm having a cam surface having a collar also mounted on said shaft and adjustable relative to said pendulum arm, a shaft mounted on said standard parallel to said first shaft, an arm mounted thereon having a cam roller thereon contacting said cam surface, a quadrant pulley also mounted on said shaft, an indicating shaft mounted a substantial distance from said meter tube and standard and having an indicating hand and a pulley mounted thereon, means connecting said pulley to said quadrant pulley and an indicating scale adjacent said indicating hand having indicia including a special test mark for use in connection with said test tubes thereon.

2. A pressure responsive device, comprising a Venturi meter tube in a conduit, a mounting standard adjacent said Venturi meter tube having an extension, a sealed casing vertically mounted on said standard and comprising upstream and down-stream flanged sections, the upstream section having a stuffing box in the side wall thereof, a diaphragm having a larger diameter when flat than the interior of said sections and mounted between said flanged sections to form upstream and downstream compartments variable in size according to the differential produced by said Venturi meter tube, said sections each having standard stops projecting inwardly from each side wall thereof to provide standard no-slack positions for said diaphragm, a pipe connecting the upstream compartment with the upstream end of said Venturi meter tube, a pipe connecting the downstream compartment with the throat of said Venturi meter tube, a relatively short test pipe having an open top end and connected to said downstream compartment, a relatively longer test pipe having an open top end and connected to said upstream compartment, a shaft having a knife edge mounted on a portion of said standard, a pendulum arm mounted on said shaft, a pendulum weight adjustable longitudinally of said arm, an arm also mounted on said shaft having a notch therein, a tension link connected to said diaphragm extending through the stuffing box of said upstream section and having a knife-edge adjustable length-wise thereof registering in said notch, an adjustable stop mounted on said pendulum arm adapted to abut an extension of said standard for zero setting of said pendulum, a cam arm having a cam surface mounted on a collar also mounted on said shaft and adjustable relative to said first shaft, an arm mounted thereon having a cam roller thereon abutting said cam surface and a quadrant pulley also mounted on said shaft having an indicating mark thereon and an indicating pointer mounted on said standard adjacent said indicating mark.

3. A pressure responsive device, comprising pressure differential producing means, a mounting standard adjacent said pressure differential producing means, a sealed casing vertically mounted on said standard and comprising upstream and downstream flanged sections, a diaphragm mounted between said flanged sections to form upstream and downstream compartments variable in size according to the differential produced by said pressure differential producing means, means connecting the upstream compartment with the upstream end of said pressure differential producing means, means connecting the downstream compartment with the downstream end of said pressure differential producing means, a shaft mounted on a portion of said standard, a pendulum arm mounted on said shaft, a pendulum weight mounted on said arm, an arm also mounted on said shaft and having a notch therein, a tension link connected to said diaphragm and having a knife-edge adjustable lengthwise thereof registering in said notch, a cam arm having a cam surface and a collar also mounted on said shaft and adjustable relative to said pendulum arm, a second shaft mounted on said standard parallel to said first shaft, an arm mounted on said second shaft and having a cam roller thereon contacting said cam surface and indicating means actuated by said arm.

4. A pressure responsive device comprising pressure differential producing means in a conduit, a mounting standard adjacent said pressure differential producing means, a sealed casing vertically mounted on said standard and comprising upstream and downstream flanged sections, a diaphragm mounted between said flanged sections to form upstream and downstream compartments variable in size according to the differential produced by said pressure differential producing means, means connecting the upstream compartment with the upstream end of said pressure differential producing means, means connecting said downstream compartment with the downstream end of said pressure differential producing means, a relatively short test pipe having an open top connected to said downstream compartment, a relatively longer test pipe having an open top end and connected to said upstream compartment, a shaft mounted on a portion of said standard, a pendulum arm mounted on said shaft, a pendulum weight adjustable longitudinally of said arm, an arm also mounted on said shaft and having a notch therein, a tension link connected to said diaphragm and having a knife edge adjustable lengthwise thereof registering in said notch, a cam having a cam surface and a collar also mounted on said shaft adjustable relative to said pendulum arm, a second shaft mounted on said standard parallel to said first shaft, an arm mounted on said second shaft and having a cam roller thereon abutting said cam surface, a quadrant pulley also mounted on said shaft, an indicating shaft mounted a substantial distance from said meter tube and standard and having an indicating hand and a pulley mounted thereon, means connecting said pulley to said quadrant pulley and an indicating scale adjacent said indicating hand and having indicating indicia including a special test mark for use in connection with said test tubes thereon.

5. A pressure responsive device, comprising a pressure differential producing means in a conduit, a mounting standard adjacent said pressure differential producing means and having an extension, a sealed casing vertically mounted on said standard and comprising upstream and downstream flanged sections, a diaphragm having a larger diameter when flat than the interior of said sections and mounted between said flanged sections to form upstream and downstream compartments variable in size according to the differential produced by said pressure differential producing means, said sections each having standard stops projecting inwardly from each side wall thereof to provide standard no-slack positions for said diaphragm, means connecting the upstream compartment with the upstream end of said pressure differential producing means, means connecting the downstream compartment with the downstream end of said pressure differential producing means, a shaft mounted on a portion of said standard, a pendulum arm mounted on said shaft, a pendulum weight mounted on said arm, an arm also mounted on said shaft and having a notch therein, a tension link connected to said diaphragm and having a knife-edge adjustable lengthwise thereof registering in said notch, an adjustable stop mounted on said pendulum arm adapted to abut said extension of said standard for zero setting of said pendulum, a cam arm having a cam surface and a collar and also mounted on said shaft adjustable relative to said pendulum arm, a second shaft mounted on said standard parallel to said first shaft, an arm mounted on said second shaft and contacting said cam surface and indicating means actuated by said arm.

6. In a pressure responsive device, in combination, a casing comprising two flanged sections bolted together, a diaphragm having a larger diameter when flat than the diameter of the interior of said sections and having bolt openings disposed on a larger circle than the bolt circle of the casing sections and mounted between said flanged sections to form compartments and variable in position in accordance with changes in pressure, said sections each having standard stops projecting inwardly from each side wall thereof to provide standard no-slack positions for said diaphragm and a movable member actuated by said diaphragm and means to limit the movement of the movable member to provide a standard zero position for said diaphragm at a standard distance from its stop abutting no-slack position.

7. In a pressure responsive device, in combination, a casing, a diaphragm mounted within said casing to form compartments and variable in position in accordance with changes in pressures, said sections each having standard stops projecting inwardly from each side wall thereof to provide standard no-slack positions for said diaphragm and a movable member actuated by said diaphragm and means to limit the movement of the movable member to provide a standard zero position for said diaphragm at a standard distance from its stop-abutting no-slack position.

8. In a pressure responsive device, in combination, a casing, a diaphragm mounted within said casing to form compartments and variable in position in accordance with the changes in pressure and having no slack and zero positions, a movable member actuated by said diaphragm, an adjustable resisting device actuated by said movable member to vary the force exerted by said movable member and having a zero position and means to vary the length of said movable member to move said diaphragm from no-slack to zero position and synchronize the zero position of said resisting device with the zero setting of the diaphragm.

9. In a pressure responsive device, in combination, a casing, a diaphragm mounted within said casing to form compartments and variable in position in accordance with the changes in pressure and having no slack and zero positions, a movable member actuated by said diaphragm, an adjustable resisting device actuated by said movable member to vary the force exerted by said movable member and having a zero position and means to vary the length of said movable member to move said diaphragm from no-slack to zero position and synchronize the zero positions of said resisting device with the zero setting of the diaphragm and means to adjust said resisting device a standard amount from its zero position.

10. In a pressure responsive device, in combination, a casing consisting of two flanged sections clamped together by bolts extending through bolt circles therein, a diaphragm having a larger diameter when flat than the diameter of the interior of said sections and having bolt openings disposed on a larger circle than that of the bolt circles of the casing sections to form compartments and variable in position in accordance with the changes in pressure, said sections each having standard stops projecting inwardly from each side wall thereof to provide standard no slack positions for said diaphragm and said diaphragm having a standard zero position at a standard distance from its stop abutting no-slack position, a movable member actuated by said diaphragm, a pendulum weight actuated by said movable member and radially adjustable from its axis and having a zero position, adjustable means to vary the length of said movable member to move said diaphragm from the no-slack to zero position and to synchronize the zero position of the pendulum with the zero setting of the diaphragm, exhibiting means, a movable member for operating said exhibiting means an adjustable cam mounted on the same axis as the pendulum moved by said movable member and means movable over said cam and connected to said movable exhibiting means operating member to move the same in a predetermined relation to the pressures.

11. In a pressure responsive device, in combination, a casing, a diaphragm mounted within said casing to form compartments and variable in position in accordance with the changes in pressure and having no slack and zero positions, a movable member actuated by said diaphragm, an adjustable resisting device actuated by said movable member to vary the force exerted thereby and having a zero position and means to vary the length of said movable member to move said diaphragm from no-slack to zero position and synchronize the zero position of said resisting device with the zero setting of the diaphragm, exhibiting means including a movable member for operating said exhibiting means, a cam moved by said movable member and means movable over said cam and connected to said exhibiting means operating member to move the same in a predetermined relation to the pressures.

12. In a pressure responsive device, in combination, a casing consisting of two flanged sections clamped together by bolts extending through bolt circles therein, a diaphragm having a larger diameter when flat than the diameter of the interior of said sections and bolt openings disposed on a larger circle than the bolt circles of the casing sections by a standard ratio and mounted between said flanged sections to form compartments and variable in position in accordance with the changes in pressure, said sections each having standard stops projecting inwardly from each side wall thereof to provide standard no-slack positions for said diaphragm and said diaphragm having a standard zero position at a standard distance from its stop abutting no-slack position, a movable member actuated by said diaphragm, a pendulum weight actuated by said movable member and adjustable from its axis, adjustable means to vary the length of said movable member to move said diaphragm from the no-slack to zero position and to synchronize the zero position of the pendulum with the zero setting of the diaphragm, exhibiting means, a movable member for operating said exhibiting means and an adjustable cam mounted on the same center as the pendulum moved by said movable member and arranged to act upon said exhibiting means operating member to move the same in a predetermined relation to the pressures and an adjustable stop abutting the pendulum to move it a standard amount from its vertical zero position prior to zero setting of the exhibiting means.

13. In a pressure responsive device, in combination, a casing, a diaphragm mounted within said casing to form compartments and variable in position in accordance with changes in pressure and having no-slack and zero positions, a movable member actuated by said diaphragm, an adjustable resisting device actuated by said movable member to vary the force exerted thereby and having a zero position and means to vary the length of said movable member to move said diaphragm from no-slack to zero position and synchronize the zero position of said resisting device with the zero setting of the diaphragm, exhibiting means, including a movable member for operating said exhibiting means and a cam moved by said movable member first named and arranged to act upon said exhibiting means operating member to move the same in a predetermined relation to the pressures and means to adjust said resisting device a standard amount from its zero position prior to zero setting of said exhibiting means.

14. In a pressure responsive device, in combination, a casing, a diaphragm mounted within said casing to form compartments and variable in position in accordance with changes in pressure and having no-slack and zero positions, a movable member actuated by said diaphragm, an adjustable resisting device actuated by said movable member to vary the force exerted thereby and having a zero position and means to vary the length of said movable member to move said diaphragm from no-slack to zero position and synchronize the zero position of said resisting device with the zero setting of the diaphragm, exhibiting means having a special test work thereon, including a movable member for operating said exhibiting means and a cam moved by said movable member and arranged to act upon said exhibiting means operating member to move the same in a predetermined relation to the pressures and means to adjust said resisting device a standard amount from its zero position prior to zero setting of said exhibiting means and supplemental test means attached to said casing adapted to function in association with said special test mark on said exhibiting means.

15. In a pressure responsive device, in combination, a casing comprising two flanged sections clamped together by bolts extending through bolt circles therein, a diaphragm having a larger diameter when flat than the interior diameter of said sections and having bolt openings of a larger circle than the bolt circles of the casing sections by a standard ratio and mounted between said flanged sections to form compartments and variable in position in accordance with changes in pressures, said sections each having standard stops projecting inwardly from each side wall thereof to provide standard no-slack positions for said diaphragm and said diaphragm having a standard zero position at a standard distance from its stop-abutting no-slack position, a movable member actuated by said diaphragm, a pendulum weight actuated by said movable member and radially adjustable from its axis, adjustable means to vary the length of said movable member to move said diaphragm from its slack to zero position and to synchronize the zero settings of the diaphragm and pendulum, exhibiting means, having a special test mark thereon, a movable member for operating said exhibiting means and a cam having a collar adjustably mounted on the same axis as the pendulum moved by said movable member first named and arranged to act upon said exhibiting means operating member to move the same in a predetermined relation to the pressures and an adjustable stop abutting the pendulum to move it a standard amount from its vertical zero position prior to zero setting of the exhibiting means and supplemental test means attached to said casing adapted to function in association with said special test mark on said exhibiting means to permit proper radial adjustment of said pendulum for accurate setting of the exhibiting means.

16. In a pressure responsive device, in combination, a casing comprising two flanged sections clamped together by bolts extending through bolt circles therein, a diaphragm having a larger diameter when flat than the diameter of the interior of said sections and having bolt openings of a larger circle than the bolt circles of the casing sections by a standard ratio and mounted between said flanged sections to form compartments and variable in position in accordance with the changes in pressure and having no-slack and zero positions, said sections each having stops projecting inwardly from each side wall thereof to provide standard no-slack positions for said diaphragm and said diaphragm having a standard zero position at a standard distance from its stop-abutting no-slack position, a movable member actuated by said diaphragm, a pendulum actuated by said movable member and adjustable means to vary the length of said movable member to move said diaphragm from the slack to zero position and to synchronize the zero no-slack position of the pendulum with the zero setting of the diaphragm.

In testimony whereof we affix our signatures.

HARRY S. DOLBEY.
ED S. SMITH, JR.